March 7, 1967  O. C. KOPPEN  3,307,808
AIRPLANE LONGITUDINAL TRIM CONTROL
Filed Dec. 20, 1965
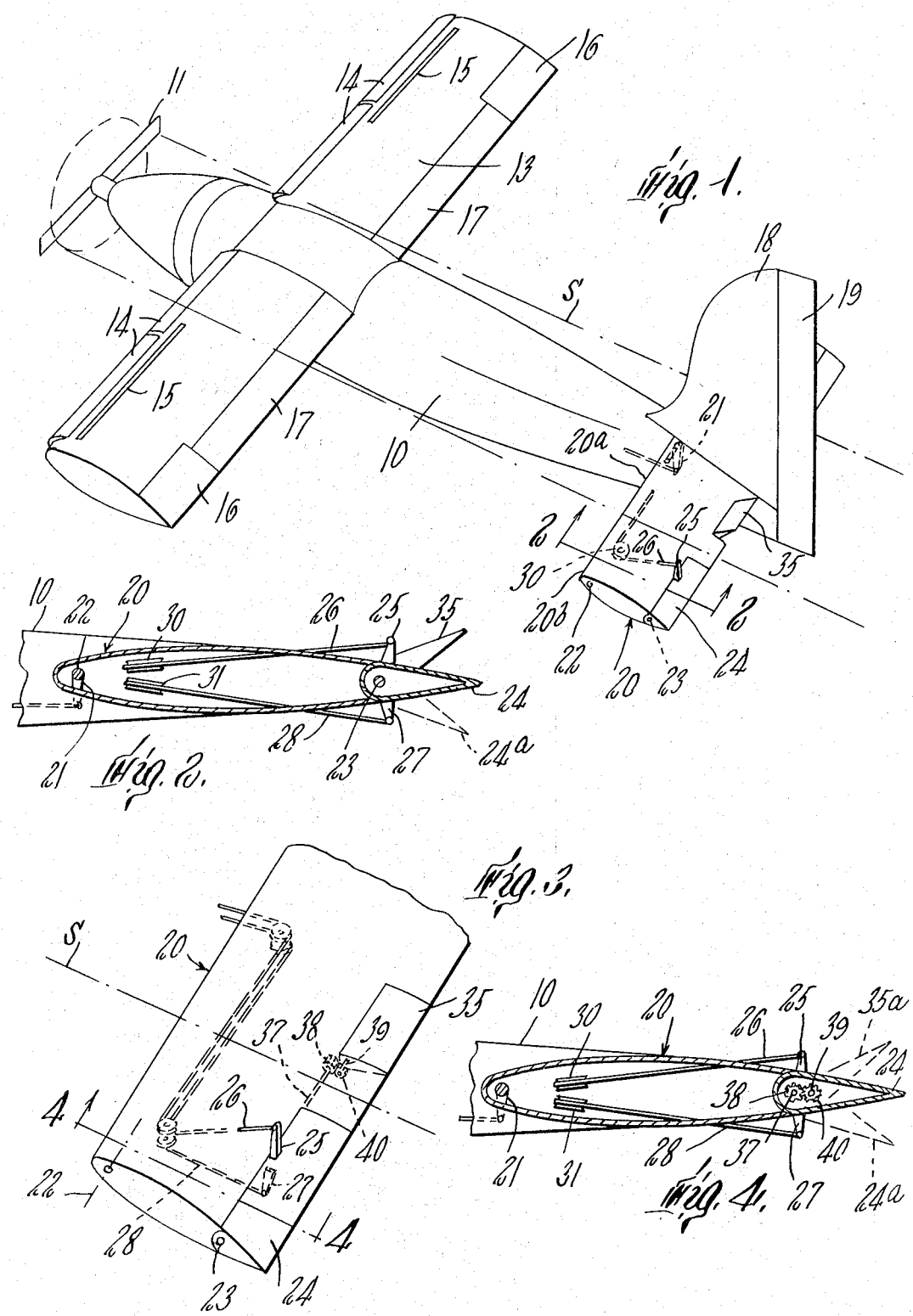

United States Patent Office 3,307,808
Patented Mar. 7, 1967

3,307,808
AIRPLANE LONGITUDINAL TRIM CONTROL
Otto Carl Koppen, Wellesley Hills, Mass., assignor to Helio Aircraft Corporation, Bedford, Mass., a corporation of Delaware
Filed Dec. 20, 1965, Ser. No. 514,837
3 Claims. (Cl. 244—87)

This invention relates to fixed wing propeller driven airplanes and more particularly to longitudinal trim means effective to reduce power-on, power-off trim changes in such airplanes.

In fixed wing propeller driven airplanes having a portion of the movable horizontal tail surface in the slipstream, the most rearward allowable airplane center of gravity position is limited by the power-on, free control, longitudinal stability. In the case of such airplanes having a high ratio of horsepower to propeller disc area, the required forward shift of the airplane center of gravity due to power effects may be as much as 25 percent of the mean wing chord. This condition places severe restrictions on the use of the rear cabin area for loading and consequently reduces the usefulness of the aircraft. Moreover, if the most rearward airplane center of gravity position is fixed by the minimum margin of power-on, free control, static longitudinal stability allowed by the F.A.A. (U.S.) certification regulations, the power-off margin of stability will be very large. Since aircraft are generally landed power-off, this large degree of stability compromises the design of the longiudinal control surfaces to an undesirable extent.

In addition, in this type of aircraft the longitudinal trim changes between power-on and power-off conditions are large. For example, if the aircraft is trimmed in a full power climb, it becomes very nose-heavy when the power is reduced. Conversely, if the airplane is trimmed power-off as for a landing approach, it becomes very tail-heavy when full power is applied, as in the case of an emergency climb following a missed approach or a balked landing.

The necessary trim changes under these latter conditions are much more troublesome to the pilot than the variation of static stability with power, since he may be required to make trim changes under critical flight conditions when his attention is better directed to his other problems.

Accordingly, the principal objects of this invention are to increase the power-on, free control longitudinal stability without affecting the power-off stability and to reduce the change of longitudinal trim between power-on and power-off conditions.

In general, my invention is useful in fixed wing airplanes having a propeller producing a slipstream and involves novel longitudinal trim control means effective both to increase power-on stability and to reduce power-on, power-off trim variations in such airplanes.

More particularly, such control means comprises a manual movable elevator having a portion within the slipstream and a portion outside of the slipstream, a manual downwardly directable adjustable trim tab on the elevator portion outside of the slipstream and a unique compensating tab on the elevator portion within the slipstream. The compensating tab is maintained in upwardly directed position at least when the trim tab is in downwardly directed position so that it will be operative during slow speed flight when it is needed. With relatively slow airplanes, the compensating tab may be fixed in upwardly directed position. With faster airplanes, the compensating tab and the trim tab may be linked by suitable means to move it to its upwardly directed position upon downwardly directed adjustment of the trim tab for slow flight, so that the compensating tab is, in effect, automatically retracted for reduced drag during high speed flight.

For the purpose of more fully describing preferred embodiments of my invention, reference is now made to the following drawings, wherein:
FIG. 1 is an isometric view illustrating a preferred embodiment of the invention in a single engined airplane;
FIG. 2 is a sectional side view of the elevator of the airplane of FIG. 1, taken on line 2—2 thereof;
FIG. 3 is an isometric view of a modification of the elevator portion of the airplane of FIG. 1, illustrating another preferred embodiment of the invention; and
FIG. 4 is a sectional side view of the elevator of FIG. 3.

The airplane of FIG. 1 has a fuselage 10 having mounted at its forward end a tractor propeller 11 producing a rearwardly extending generally cylindrical slipstream, the outer boundaries of which are indicated by dotted line S. Normally the slipstream does not exceed about 0.9 of the propeller diameter.

The airplane is provided with a wing 13 which may preferably be of the high lift type with full span automatically operating slats 14 and long span slotted flaps 17 controllable through conventional means (not shown). The lateral control is by the linked interceptors 15 and short span ailerons 16 operated through a conventional common control means, stick or wheel (not shown), yawing control is by rudder 19 hinged to vertical fin 18 and the longitudinal pitch control by the all-moving unitized through fixedly attached lever 21 by said conventional stick or wheel.

The arrangement so far described is conventional, being shown and described, for example, in my Patent No. 2,719,014, the present invention being concerned with novel longitudinal trim means on the otherwise conventional elevator 20.

According to the present invention, as shown in embodiment most suited for relatively slow speed airplanes both in FIG. 1 and in side elevation in FIG. 2, it is important that elevator 20 be of such length as to have a portion 20a within the slipstream S and a portion 20b outside of the slipstream S, the slipstream being defined by the boundaries of an imaginary cylinder of about 0.9 of the propeller diameter extending rearwardly of the propeller with its axis coincident with that of the propeller.

The usual pilots trim tab 24 is mounted on elevator 20 for deflection about its axis 23, but is located on elevator portion 20b outside of the slipstream S for the purposes of the present invention as hereinafter explained. It is controlled by the pilot in the usual manner as by a crank (not shown) through its fixed horns 25, 27 and wires 26 and 28, which pass around pulleys 30, 31 to said crank. The trim tab 24 is characteristically directed downwardly as at 24a when the airplane is trimmed for slow speed flight, but may be adjusted to other positions including an upwardly adjusted one, for high speed flight.

The unique compensating tab 35 of the invention is located on elevator portion 20a within the slipstream S, so that it will be subjected to air velocity variations between power-on and power-off conditions. It may be fixed in upwardly directed position, without provision for adjustment as in FIGS. 2 and 3 if its drag is not a serious factor in high speed flight of the aircraft. However, since it is useful mainly only during slow speed flight, if desired, compensating tab 35 may in effect be automatically retracted during high speed flight for reduced drag by means of the arrangement shown in FIGS. 3 and 4.

In those figures, the compensating tab 35 is linked to trim tab 24 by means of shafts 37, 39 on trim tab 24 and compensating tab 35, respectively, the shafts having thereon interengaging gears 38, 40. For high speed flight, the pilot operated trim tab 24 is positioned generally in line with the elevator 20 with compensating tab 35 being automatically similarly aligned through its linkage. For slow speed flight, with the trim tab 24 adjusted by the pilot into downwardly directed position 24a to trim the airplane, gears 38, 40 will move compensating tab 35 to its upwardly directed, operative position. With the arrangement of FIGS. 3 and 4, either the area (as shown) or degree of displacement of trim tab 24 must be greater than that of compensating tab 35 so that the aerodynamic effectiveness of the trim tab will exceed that of the compensating tab as is necessary to achieve longitudinal trim changes.

In high speed flight the elevator angle required is small and the trim tab angle required to trim the airplane usually approaches zero. In such flight, the effect of the fixed compensating tab 35 of FIGS. 1 and 2 will be trimmed out by the pilot when he trims for high speed flight. With the structure of FIGS. 3 and 4, trimming for such flight will make the compensating tab inoperative. So far as the pilot is concerned, the effect is the same with either arrangement. When the airplane is trimmed by the pilot for slow speed flight as for climb or landing approach, the pilot's trim tab 24 will be directed downwardly as at 24a to trim the airplane. With the arrangement of FIGS. 3 and 4, because of the mechanical connection between the tabs, compensating tab 35 will then take a corresponding upward position at 35a.

With the airplane trimmed for slow speed flight, the compensating tab 35 of either embodiment provides a trailing edge down moment proportional to the square of the slipstream velocity over elevator portion 20a in power-on flight, which velocity is greater than the airspeed and hence the air velocity over elevator portion 20b. This hinge moment is balanced by the hinge moment produced by the pilot's manipulation of his trim tab 24 outside of the slipstream, to trim the airplane at any desired slow flight airspeed, as in an approach for landing.

The compensating tab 35 of the invention as located in the relatively constant velocity power-on slipstream may be considered to be an aerodynamic "down-spring." However, its effect virtually disappears when the throttle is closed to idling position, as under such conditions the air velocity over the entire elevator and tabs 24 and 35 is substantially the same. As a result, there is no increase in free-control stability, power-off. Moreover, when the throttle is closed, the loss of slipstream velocity over compensating tab 35 produces a change in elevator hinge moment that causes the trailing edge of the elevator to move up. This change in elevator position reduces the normal airplane nose-down tendency due to a loss of power, so that very little change in longitudinal trim results.

The invention, then, greatly reduces trim changes in slow speed flight, so that the pilot finds it unnecessary to retrim the airplane during his approach, regardless of power changes. This is particularly important should the pilot have to apply full power for an emergency climb during the latter stages of his approach, since at that point he may be busy retracting his landing gear and flaps and may not immediately have a hand free to operate his trim control.

Various modifications of the invention, not herein described, within the spirit thereof and the scope of the appended claims, will be apparent to those skilled in the art.

I claim:
1. In a fixed wing airplane having a propeller producing a slipstream
    longitudinal trim control means effective to reduce power-on, power-off trim changes comprising
    a manual movable elevator having a portion within said slipstream and a portion outside of said slipstream
    a manual downwardly-directable adjustable trim tab on said elevator portion outside of said slipstream and
    a compensating tab on said elevator portion within said slipstream and maintained in upwardly directed position at least when said trim tab is in downwardly directed position.
2. In a fixed wing airplane as claimed in claim 1 wherein
    said compensating tab is fixed in upwardly directed position.
3. In a fixed wing airplane as claimed in claim 1 wherein
    said compensating tab and said trim tab are linked by means providing said upwardly directed position of said compensating tab upon downwardly directed adjustment of said trim tab.

No references cited.

MILTON BUCHLER, *Primary Examiner.*

A. H. FARRELL, *Assistant Examiner.*